2,848,440
Patented Aug. 19, 1958

2,848,440

COPOLYMERS OF VINYL LACTAMS AND TRIMETHALLYL ISOCYANURATE

Clyde W. Davis, Antioch, and Forrest A. Ehlers, Walnut Creek, Calif., assignors to The Dow Chemical Company, Midland, Mich., a corporation of Delaware No Drawing. Application October 18, 1956
Serial No. 616,647

4 Claims. (Cl. 260—77.5)

This invention relates to novel, dye-receptive copolymers of vinyl lactam monomers and trimethallyl isocyanurate and its equivalent close homologues that are insoluble in water and has particular reference to copolymers of vinyl pyrrolidone and trimethallyl isocyanurate.

Many of the polymers and copolymers that are comprised of vinyl lactam monomers are attributed with a pronounced capacity for accepting a wide variety of dyestuffs. As a consequence, it is beneficial to employ such polymeric materials as dye-assisting adjuvants in synthetic fiber-forming polymeric compositions that may ordinarily be difficult to dye, especially in acrylonitrile polymer compositions, in order to enhance the dye-receptive properties of such compositions. Although their utilization in this manner is desirable, the conventional polymers and copolymers of vinyl lactams, particularly polyvinylpyrrolidone, are quite susceptible to being dissolved in water. This characteristic, as can be appreciated, may diminish the complete advantage that might otherwise be secured by their employment as dye-assisting adjuvants in polymeric fiber-forming compositions. Dissatisfactory results may be especially manifest when the compositions are fabricated into such shaped articles as fibers and the like including cloth and fabric constructed therefrom which are commonly subjected to the extractive influence of water whenever they are washed, scoured or laundered during their manufacture or in the course of their useful life as a textile article, or both.

As may be apparent, one of the undesirable consequences of employing a water-soluble dye-assisting adjuvant in fiber-forming polymeric compositions is to require that a sufficiently large quantity of the additament be incorporated in the composition to ensure that the shaped articles, particularly textile fibers, prepared from such compositions may have an acceptable dye-receptivity despite dissolution losses of the adjuvant that may be encountered prior to dyeing the shaped article. Frequently the quantities of the adjuvant that must be employed to compensate for dissolution losses are so large as to deleteriously influence the properties of the composition. Another difficulty that may be encountered when employing water-soluble dye-assisting adjuvants in polymeric fiber-forming compositions is to impart poor wash-fastness to the dyed, shaped articles that may be prepared from the compositions.

It would be advantageous, and it is among the principal objects of the present invention, to provide dye-receptive copolymers of vinyl lactam monomers, especially copolymers of vinyl pyrrolidone, that are insoluble in water and particularly adapted for being employed and permanently retained as dye-assisting adjuvants in synthetic polymeric fiber-forming compositions, especially in acrylonitrile polymer compositions.

To the attainment of these and related ends, a dye-receptive, water-insoluble copolymer that is especially well suited for being employed as a dye-assisting adjuvant in synthetic, fiber-forming, polymeric compositions, particularly acrylonitrile polymer compositions, is comprised of a copolymer of a vinyl lactam monomer and trimethallyl isocyanurate or one of its equivalent close homologues. Advantageously, as mentioned, the vinyl lactam monomer that is copolymerized with the trimethallyl isocyanurate is vinyl pyrrolidone. It is usually beneficial for the copolymers of the present invention to contain a major proportion of the vinyl lactam monomer polymerized in the copolymer. Usually, for example, it is desirable for the copolymer to contain between about 80 and 98 percent by weight of the vinyl lactam monomer polymerized in the copolymer molecule, particularly when the copolymer is intended for application as a dye-assisting adjuvant. In many instances it may be satisfactory for a copolymer that is intended for such application to contain in the neighborhood of 90 percent by weight of the vinyl lactam monomer polymerized in the copolymer molecule.

The copolymers of the present invention may be prepared by polymerizing the monomeric ingredients at an elevated temperature under basic conditions in an aqueous medium with the assistance of a suitable catalyst such as a peroxy type polymerization catalyst. Thus, the monomers may be dispersed in water containing a sufficient quantity of ammonium hydroxide to provide a pH of between 7 and 12 in the reaction mass and may be polymerized under such basic conditions with the assistance of hydrogen peroxide as a catalyst. While temperatures between about 20° C. and the boiling point may be suitable, it is ordinarily satisfactory to conduct the polymerization at a temperature of about 50 to 80° C. Usually, depending on the specific factors that may be involved, the polymerization may be accomplished satisfactorily within a time period of from 10 to about 60 hours.

The polymerization system that is employed for the preparation of the copolymers of the present invention may consist of as much as 50 or more percent by weight of the monomers to be polymerized in the aqueous medium. The amount of monomeric material that is provided in the polymerization system may be influenced somewhat by the subsequent manner in which it may be desired to utilize the copolymers, especially when they are intended to be employed as dye-assisting adjuvants in polymeric compositions.

Thus, if it is intended to incorporate them as blended copolymers in a fiber-forming composition prior to its fabrication into shaped articles, the polymerization system may, if desired, contain about equal proportions by weight of the charged monomeric materials and the aqueous polymerization medium. In such cases, the copolymer product may ordinarily be obtained as a gel (particularly when the polymerization has been accomplished without agitation) that, after being dried and isolated from unreacted monomer, may be incorporated in the fiber-rorming composition. The copolymer may be physically reduced by comminution to a sufficiently fine state to permit its dispersion in spinnable condition throughout the blended fiber-forming composition.

If the incorporation of the copolymer as a dye-assisting adjuvant in a fiber-forming composition is to be achieved by impregnation therewith of an already formed shaped article of the composition, it may be desirable to effect the polymerization so as to directly form the polymerization system as a suitable applicating emulsion or suspension of the copolymer product. For such purposes, the polymerization system may be prepared to contain as little as 5 or 10 percent by weight of the copolymerizing monomeric ingredients. Preferably, such a copolymerization may be conducted under the influence of vigorous agitation to facilitate preparation of the copolymer emulsion. It may also be beneficial under such circumstances to incorporate a dispersant or emulsifying agent in the polymerization system to facilitate obtaining a stable and homogeneous emulsified product. Such a method for preparing the copolymers of the invention may be especially appropriate when they are intended to be applied as dye-assisting adjuvants to polyacrylonitrile fibers that are derived from aquagels in the course of their manufacture. In such instances, the emulsified copolymer may be impregnated into the fiber while it is in an aquagel condition in order to obtain the desired dye-receptive copolymer-containing fiber product.

The copolymers of the invention, particularly those prepared with vinyl pyrrolidone, have the capacity to accept and retain many of a wide variety of dyestuffs, including acetate, direct, acid and vat dyes. They are thus adapted to imbue the polymeric fiber-forming compositions in which they may be incorporated with such desirable dye-receptive properties. In addition, probably due to the cross-linking effect which is obtained in their molecular configurations, they are insoluble in water and may thus be permanently retained in shaped articles from polymeric fiber-forming compositions in which they are incorporated, despite exposure and subjection of the shaped articles to water under extremely extractive conditions. This, of course, permits minimum quantities of the copolymers to be employed in the fiber-forming compositions so that they retain their desirable fiber-forming properties in a substantially undiminished manner. Frequently, for example, a quantity of the copolymer that is only in the amount of about 10 percent or less by weight of the polymer content of a fiber-forming composition may be employed satisfactorily as a dye-assisting adjuvant. Furthermore, the permanent retention of the water-insoluble copolymers of the invention facilitates the achievement of dyed, shaped articles from such compositions that have excellent washfast characteristics.

This invention is further illustrated in and by the following example.

Example

About 20.0 grams of vinyl pyrrolidone and 2.0 grams of trimethallyl isocyanurate were dissolved in 45 milliliters of water which contained about 0.28 milliliter of an aqueous solution of ammonium hydroxide that had a 28 percent by weight concentration and about 1.8 milliliters of an aqueous solution of hydrogen peroxide that had a 5 percent by weight concentration. The polymerization system was maintained without agitation for a period of about 16 hours at a temperature of about 50° C. A white, gel-like product was obtained which was vacuum dried to a solid polymeric product that represented about a 93.5 percent by weight recovery of the monomeric charge. The solid product was washed with water in a Soxhlet extraction and further dried to a water-insoluble copolymer of vinyl pyrrolidone and trimethallyl isocyanurate. About 60.4 percent by weight of the solid polymeric product was recovered as the water-insoluble copolymer.

The water-insoluble copolymer product, after being finely divided by comminution in a ball mill, was incorporated in the amount of about 10 percent by weight, based on the weight of total polymer, in a polyacrylonitrile fiber-forming spinning solution which was wet spun into good quality fibers that had excellent dyeability with Calcodur Pink 2BL, a direct dyestuff. The copolymer-containing fiber products did not lose significant amounts of the impregnated copolymer, even when they were subjected to water under such severe conditions as scouring at the boil in a strong aqueous solution of a detergent.

Similar results may be obtained when other proportions of vinyl pyrrolidone are polymerized in the copolymer products of the invention and when other vinyl lactams, particularly vinyl caprolactam, are utilized for their manufacture.

What is claimed is:

1. A dye-receptive, water-insoluble, normally solid copolymer consisting essentially of a vinyl lactam and trimethallyl isocyanurate that contains a major proportion of the vinyl lactam monomer polymerized in the copolymer molecule.

2. A dye-receptive, water-insoluble, normally solid copolymer consisting essentially of a vinyl lactam and trimethallyl isocyanurate that contains between about 80 and 98 percent by weight of the vinyl lactam monomer polymerized in the copolymer molecule.

3. A dye-receptive, water-insoluble, normally solid copolymer consisting essentially of vinyl pyrrolidone and trimethallyl isocyanurate and containing between about 80 and 98 percent by weight of vinyl pyrrolidone polymerized in the copolymer molecule.

4. A dye-receptive, water-insoluble, normally solid copolymer consisting essentially of vinyl pyrrolidone and trimethallyl isocyanurate and containing about 90 percent by weight of vinyl pyrrolidone polymerized in the copolymer molecule.

References Cited in the file of this patent
UNITED STATES PATENTS

| | | |
|---|---|---|
| 2,496,097 | Kropa | Jan. 31, 1950 |
| 2,643,990 | Ham | June 30, 1953 |

OTHER REFERENCES

Noller: "Textbook of Organic Chemistry" (Philadelphia: W. B. Saunders Co., 1951), page 243.